United States Patent
Matsushita et al.

(10) Patent No.: US 6,885,128 B2
(45) Date of Patent: Apr. 26, 2005

(54) LOW-PROFILE STEPPING MOTOR WITH TWO COILS ARRANGED FLUSH WITH EACH OTHER HORIZONTALLY

(75) Inventors: Kunitake Matsushita, Shizuoka-ken (JP); Hiroshi Sano, Shizuoka-ken (JP); Toshihiko Nagata, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 49 days.

(21) Appl. No.: 10/672,256

(22) Filed: Sep. 26, 2003

(65) Prior Publication Data
US 2004/0080233 A1 Apr. 29, 2004

(30) Foreign Application Priority Data
Oct. 24, 2002 (JP) ........................... 2002-309904

(51) Int. Cl.[7] .......................... H02K 1/18; H02K 37/12; H02K 37/14
(52) U.S. Cl. ........................ 310/257; 310/216; 310/217; 310/254; 310/259; 310/49 R
(58) Field of Search ................ 310/49 R, 216, 310/217, 254, 257, 259

(56) References Cited
U.S. PATENT DOCUMENTS

| | | | |
|---|---|---|---|
| 5,703,419 A | * | 12/1997 | Mizutani ............... 310/49 R |
| 5,829,119 A | * | 11/1998 | Matsushita et al. ......... 29/596 |
| 6,703,728 B1 | * | 3/2004 | Goubely et al. .......... 310/49 R |

FOREIGN PATENT DOCUMENTS

| | | |
|---|---|---|
| FR | 2 793 966 A1 | 11/2000 |
| JP | 61 295854 | 12/1986 |
| JP | 63 240361 | 10/1988 |
| JP | 01 099466 | 4/1989 |
| JP | 01 136550 | 5/1989 |
| JP | 11 196543 | 7/1999 |

* cited by examiner

Primary Examiner—Tran Nguyen
(74) Attorney, Agent, or Firm—Choate, Hall & Stewart LLP (57) ABSTRACT

A low-profile stepping motor has a stator assembly structured such that first and second coil units are disposed flush with each other horizontally and are sandwiched between upper and lower stator yoke pieces each comprising first and second stator yokes which are punched out integrally with each other, are shaped symmetrically, and which each have a plurality of pole teeth along its semi-circular inner circumference. The upper and lower stator yoke pieces are fixedly put together via the coils such that hollow-cylindrical protrusions formed in the upper and lower stator yoke pieces are inserted into through-holes of first and second coil bobbins from the upper and lower sides, respectively, and have their abutting end surfaces welded, bonded or otherwise fixed to each other, whereby the coil units are surely held between the upper and lower stator yoke pieces.

8 Claims, 5 Drawing Sheets

LOW-PROFILE STEPPING MOTOR WITH TWO COILS ARRANGED FLUSH WITH EACH OTHER HORIZONTALLY

BACKGROUND OF THE INVENTION

1. Field of the Invention

The present invention relates to a stepping motor, and specifically to a low-profile stepping motor having its dimension reduced in an axial direction.

2. Description of the Related Art

Recently, in accordance with enhanced performance of various devices such as printers, facsimiles and floppy (Registered Trademark) disk drives, a stepping motor is required to be higher in torque, and lower in cogging torque and vibration. Under the circumstance, a PM (permanent magnet) stepping motor such as disclosed in Japanese Patent Application Laid-open No. Hei 10-127024 has been extensively used to meet the requirements.

Figure 1:
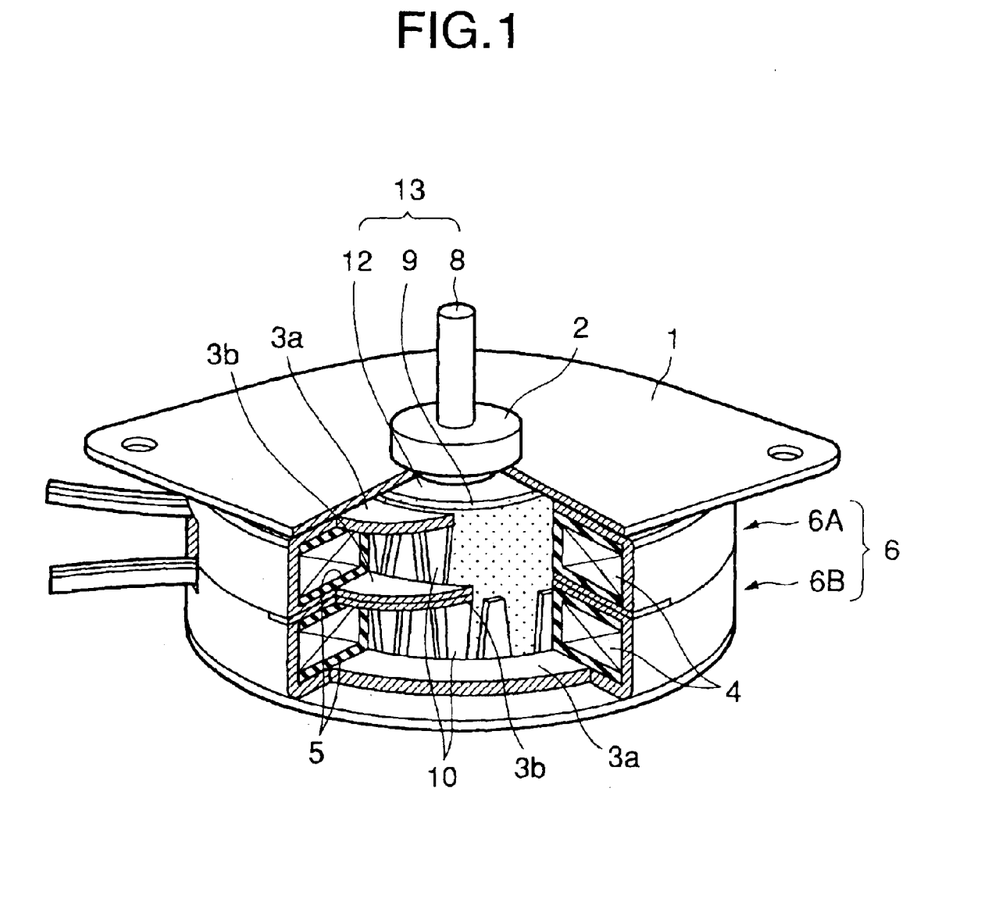
FIG. 1 is a partly cutaway view of a conventional PM stepping motor.

FIG. 1 is a partly cutaway perspective view of a conventional PM stepping motor. As shown in FIG. 1, the PM stepping motor generally comprises: a stator assembly 6 composed of two stator units 6A and 6B; a rotor assembly 13; a face plate 1 punched out of a stainless steel plate; and a front bearing 2 made of oil impregnated alloy. The stator units 6A and 6B each comprise: stator yokes 3a and 3b each punched out of a soft magnetic steel plate and each having a plurality of pole teeth 10 bent up along its inner circumference; and a coil 4 formed such that a copper wire with polyurethane insulation is wound on a bobbin 5 housed in the stator yokes 3a and 3b, and are attached back-to-back to each other. The rotor assembly 13 comprises: a rotary shaft 8; a cylindrical magnet 9 for magnetic field, having a plurality of magnetic poles at its circumferential surface, and having the circumferential surface opposing the pole teeth 10 of the stator yokes 3a, 3b; and a sleeve 12 to fasten the cylindrical magnet 9 and the rotary shaft 8 together such that the rotary shaft 8 is press fitted into the sleeve 12, and the sleeve 12 with adhesive applied thereon is inserted into the cylindrical magnet 9. The rotor assembly 13 thus structured has its outer circumference (of the magnet 9) magnetized for a predetermined number of magnetic poles, and is rotatably disposed inside the stator assembly 6 such that the rotary shaft 8 is supported by the front bearing 2 and a rear bearing (not shown in FIG. 1), and that the magnetic poles oppose the pole teeth 10 with a slight gap therebetween.

The stator unit 6A is structured such that the pole teeth 10 of the stator yoke 3a mesh with the pole teeth 10 of the stator yoke 3b equidistantly from each other with a shift by an electrical angle of 180 degrees (half pitch). The stator unit 6B is of the same structure as the stator unit 6A. The stator units 6A and 6B thus structured are joined back-to-back to each other by molding with polymeric material or by plasma welding such that their respective pole teeth 10 and 10 are shifted from each other by an electrical angle of 90 degrees, whereby the rotor assembly 13 always starts its rotation in the same direction.

Recently, since the devices incorporating PM stepping motors are required to be downsized and lower-profiled, the PM stepping motors are also required to be further lower-profiled. The conventional PM stepping motor, however, is composed of two stator units joined to each other back-to-back thus making it extremely difficult or almost impossible to further reduce its profile dimension. And the conventional PM stepping motor uses four discrete stator yokes, which inevitably increases the number of the components and makes alignment troublesome.

SUMMARY OF THE INVENTION

The present invention has been made in view of the above circumstance, and it is an object of the present invention to provide a low-profile stepping motor which is of a simple structure and which has its dimension drastically reduced in the axial direction.

In order to achieve the object, according to a first aspect of the present invention, a low-profile stepping motor comprises a first stator unit, a second stator unit, and a rotor assembly. The first stator unit includes: a first upper stator yoke which has a plurality of pole teeth formed along its semicircular inner circumference, and which has a hollow-cylindrical protrusion with a top lid; a first lower stator yoke which has a plurality of pole teeth formed along its semicircular inner circumference and adapted to mesh with the pole teeth of the first upper stator yoke, and which has a hollow-cylindrical protrusion with a top lid positioned to oppose the protrusion of the first upper stator yoke thus configuring a pair of opposing protrusions; and a first coil unit which is fixedly sandwiched between the first upper and lower stator yokes. The second stator unit includes: a second upper stator yoke which is formed as one piece integrally with the first upper stator yoke, has a plurality of pole teeth formed along its semicircular inner circumference, and which has a hollow-cylindrical protrusion with a top lid; a second lower stator yoke which is formed as one piece integrally with the first lower stator yoke, has a plurality of pole teeth formed along its semicircular inner circumference and adapted to mesh with the pole teeth of the second upper stator yoke, and which has a hollow-cylindrical protrusion with a top lid positioned to oppose the protrusion of the second upper stator yoke thus configuring a pair of opposing protrusions; and a second coil unit which is fixedly sandwiched between the second upper and lower stator yokes and which is arranged horizontally flush with the first coil unit. And the rotor assembly is rotatably disposed in a circular open space defined by the pole teeth of the first and second stator units. With the structure above described, while the stepping motor can be significantly reduced in thickness, the coil unit can be easily attached to the stator yokes due to the protrusions, and the upper and lower stator yokes can be easily put together without any special structure such as studs.

According to a second aspect of the present invention, in the low-profile stepping motor of the first aspect, the protrusions are formed by drawing process. Consequently, the protrusions can be formed readily on the stator yokes.

According to a third aspect of the present invention, in the low-profile stepping motor of the first or second aspect, the pair of opposing protrusions have their respective top lids butting each other. Consequently, a closed magnetic path can be surely formed.

According to a fourth aspect of the present invention, in the low-profile stepping motor of the third aspect, the top lids each have a flat abutting surface. Consequently, a closed magnetic path can be effectively formed.

According to a fifth aspect of the present invention, in the low-profile stepping motor of the third aspect, the top lids each have a lug hole formed at its center. Consequently, the upper and lower stator yokes can be easily aligned to each other and also can be easily attached to the mount board. And the screw head can be well lodged in the hollow of the protrusion and does not stick out.

According to a sixth aspect of the present invention, in the low-profile stepping motor of the first aspect, the coil unit is fixedly attached to the pair of opposing protrusions such that the protrusions are fitted into a through-hole formed at the center of the coil unit respectively from upper and lower sides thereof. Consequently, the coil unit can be easily attached.

According to a seventh aspect of the present invention, in the low-profile stepping motor of the first or second aspect, one protrusion of the pair of opposing protrusions has a raised circular portion at its top lid, and the other protrusion thereof has at its top lid a recessed circular portion adapted to engage with the raised circular portion at the top lid of the one protrusion. Consequently, the upper and lower stator yokes can be easily aligned to each other by simply abutting the top lids of their respective protrusions against each other.

According to an eighth aspect of the present invention, in the low-profile stepping motor of the first or second aspect, one protrusion of the pair of opposing protrusions has a raised circular rim at its top lid, and the other protrusion thereof has at its top lid a circular hole adapted to engage with the raised circular rim at the top lid of the one protrusion. Consequently, the upper and lower stator yokes can be easily aligned to each other by simply abutting the top lids of their respective protrusions against each other.

DETAILED DESCRIPTION OF THE PREFERRED EMBODIMENTS

Preferred embodiments of the present invention will hereinafter be described with reference to the accompanying drawings.

Figure 2:
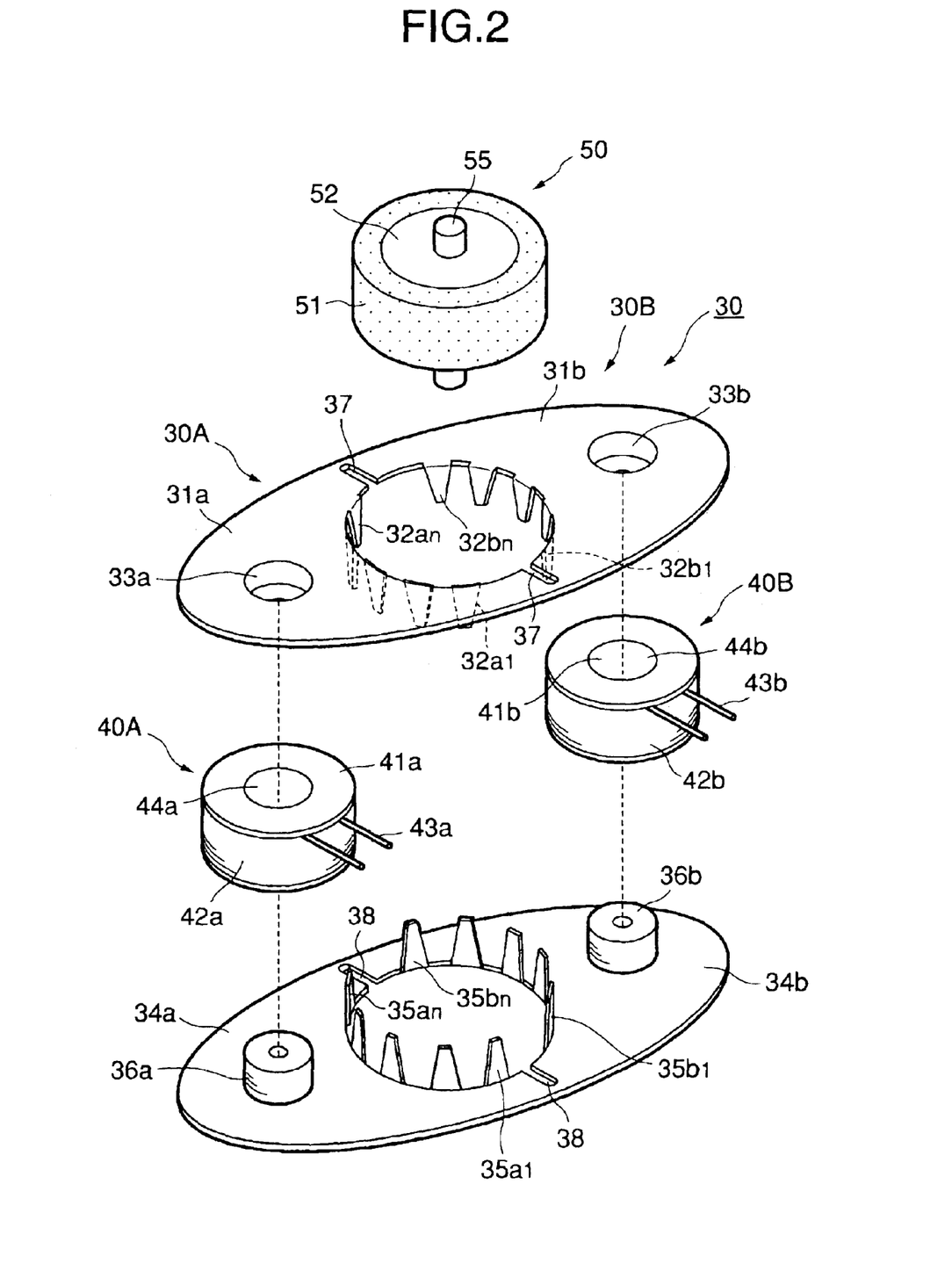
FIG. 2 is an exploded perspective view of a low-profile stepping motor according to a first embodiment of the present invention.

Referring to FIG. 2, a low-profile stepping motor of the present invention generally comprises: a stator assembly 30 including first and second stator units 30A and 30B assembled to be horizontally flush with each other; and a rotor assembly 50 rotatably disposed inside the stator assembly 30.

The first stator unit 30A comprises: first upper and lower stator yokes 31$a$ and 34$a$; and a first coil unit 40A which is composed of a bobbin 41$a$ having a through-hole 44$a$ and a winding 42$a$ provided around the bobbin 41$a$, is sandwiched between the first upper and lower stator yokes 31$a$ and 34$a$, and which is provided with a terminal pin 43$a$. The first upper stator yoke 31$a$ is punched out of a soft magnetic steel plate, includes a plurality of pole teeth 32$a$1 to 32$an$ punched out of the soft magnetic steel plate and bent up inward (downward in FIG. 2) at its semicircular inner circumference, and has a protrusion 33$a$ shaped hollow-cylindrical, having a top lid and extending inward (downward in FIG. 2) to fit into an upper half of the through-hole 44$a$ of the first coil unit 40A. The first lower stator yoke 34$a$ is punched out of a soft magnetic steel plate, includes a plurality of pole teeth 35$a$1 to 35$an$ punched out of the soft magnetic steel plate and bent up inward (upward in FIG. 2) at its semicircular inner circumference, and has a protrusion 36$a$ shaped hollow-cylindrical, having a top lid and extending inward (upward in FIG. 2) to fit into a lower half of the through-hole 44$a$ of the first coil unit 40A.

The second stator unit 30B comprises: second upper and lower stator yokes 31$b$ and 34$b$ which are punched out as one piece integrally with the first upper and lower stator yokes 31$a$ and 34$a$, respectively; and a second coil unit 40B which is composed of a bobbin 41$b$ having a through-hole 44$b$ and a winding 42$b$ provided around the bobbin 41$b$, is sandwiched between the second upper and lower stator yokes 31$b$ and 34$b$, and which is provided with a terminal pin 43$b$. The second upper stator yoke 31$b$ is punched out of a soft magnetic steel plate, includes a plurality of pole teeth 32$b$1 to 32$bn$ punched out of the soft magnetic steel plate and bent up inward (downward in FIG. 2) at its semicircular inner circumference, and has a protrusion 33$b$ shaped hollow-cylindrical, having a top lid and extending inward (downward in FIG. 2) to fit into an upper half of the through-hole 44$b$ of the second coil unit 40B. The second lower stator yoke 34$b$ is punched out of a soft magnetic steel plate, includes a plurality of pole teeth 35$b$1 to 35$bn$ punched out of the soft magnetic steel plate and bent up inward (upward in FIG. 2) at its semicircular inner circumference, and has a protrusion 36$b$ shaped hollow-cylindrical, having a top lid and extending inward (upward in FIG. 2) to fit into a lower half of the through-hole 44$b$ of the second coil unit 40B.

The plurality of pole teeth 32$a$1 to 32$an$ of the first upper stator yoke 31$a$ and the plurality of pole teeth 32$b$1 to 32$bn$ of the second upper stator yoke 31$b$ are punched out simultaneously, and the plurality of pole teeth 35$a$1 to 35$an$ of the first lower stator yoke 34$a$ and the plurality of pole teeth 35$b$1 to 35$bn$ of the second lower stator yoke 34$b$ are punched out simultaneously.

Each stator yoke has pole teeth provided in number corresponding to the required number of steps per rotation of a stepping motor and arranged equidistant from one another. The pole teeth 32$a$1 to 32$an$ of the first upper stator yoke 31$a$ and the pole teeth 35$a$1 to 35$an$ of the first lower stator yoke 34$a$ mesh with each other with a shift by an electrical angle of 180 degrees, and the pole teeth 32$b$1 to 32$bn$ of the second upper stator yoke 31$b$ and the pole teeth 35$b$1 to 35$bn$ of the second lower stator yoke 34$b$ engage with each other with a shift by an electrical angle of 180 degrees.

In each of the upper and lower stator yokes of the first and second stator units 30A and 30B thus structured, two pole teeth adjacent to each other sandwiching one of a pair of slot cuts 37 or 38 (detailed hereinafter) are shifted from each other by an electrical angle of 90 degrees or 270 degrees. Specifically, in the first and second upper stator yokes 31$a$ and 31$b$, the pole tooth 32$a$1 is shifted by an electrical angle of 90 degrees or 270 degrees from the pole tooth 32$b$1 located adjacent to the pole tooth 32$a$1 sandwiching one slit cut 37, and the pole tooth 32$an$ is shifted by an electrical angle of 90 degrees or 270 degrees from the pole tooth 32$bn$ located adjacent to the pole tooth 32$an$ sandwiching the other slot cut 37, and in the first and second lower stator yokes 34$a$ and 34$b$, the pole tooth 35$a$1 is shifted by an electrical angle of 90 degrees or 270 degrees from the pole tooth 35b1 located adjacent to the 35a1 sandwiching one slot cut 38, and the pole tooth 35an is shifted by an electrical angle of 90 degrees or 270 degrees from the pole tooth 35bn located adjacent to the pole tooth 35an sandwiching the other slot cut 38.

The first and second upper stator yokes 31a and 31b are punched out as one piece with the pair of slot cuts 37 above mentioned being formed right midway between the first and second upper stator yokes 31a and 31b thereby minimizing magnetic interflow therebetween so as not to have magnetic influence on each other, and the first and second lower stator yokes 34a and 34b are punched out as one piece with the pair of slot cuts 38 above mentioned being formed right midway between the first and second lower stator yokes 34a and 34b thereby minimizing magnetic interflow therebetween so as not to have magnetic influence on each other. The first and second upper stator yokes 31a and 31b, and the first and second lower stator yokes 34a and 34b are formed of a soft magnetic steel plate, such as silicon steel plate, SECC (galvanized steel plate) and SUY (electromagnetic soft iron).

The rotor assembly 50 comprises: a cylindrical magnet 51 formed of ferrite magnet, rear-earth magnet and so forth, and magnetized at regular intervals; a rotary shaft 55 made of non-magnetic stainless steel; and a sleeve 52 made of aluminum, and is structured such that the cylindrical magnet 51 is adhesively fixed to the sleeve 52 which has the rotary shaft 55 press-fitted thereinto. The rotor assembly 50 is rotatably disposed inside the stator assembly 30 with a slight gap between the cylindrical magnet 51 and the pole teeth of the stator assembly 30, and always starts rotating in the same direction by means of the first and second stator units 30A and 30B.

Figure 3:
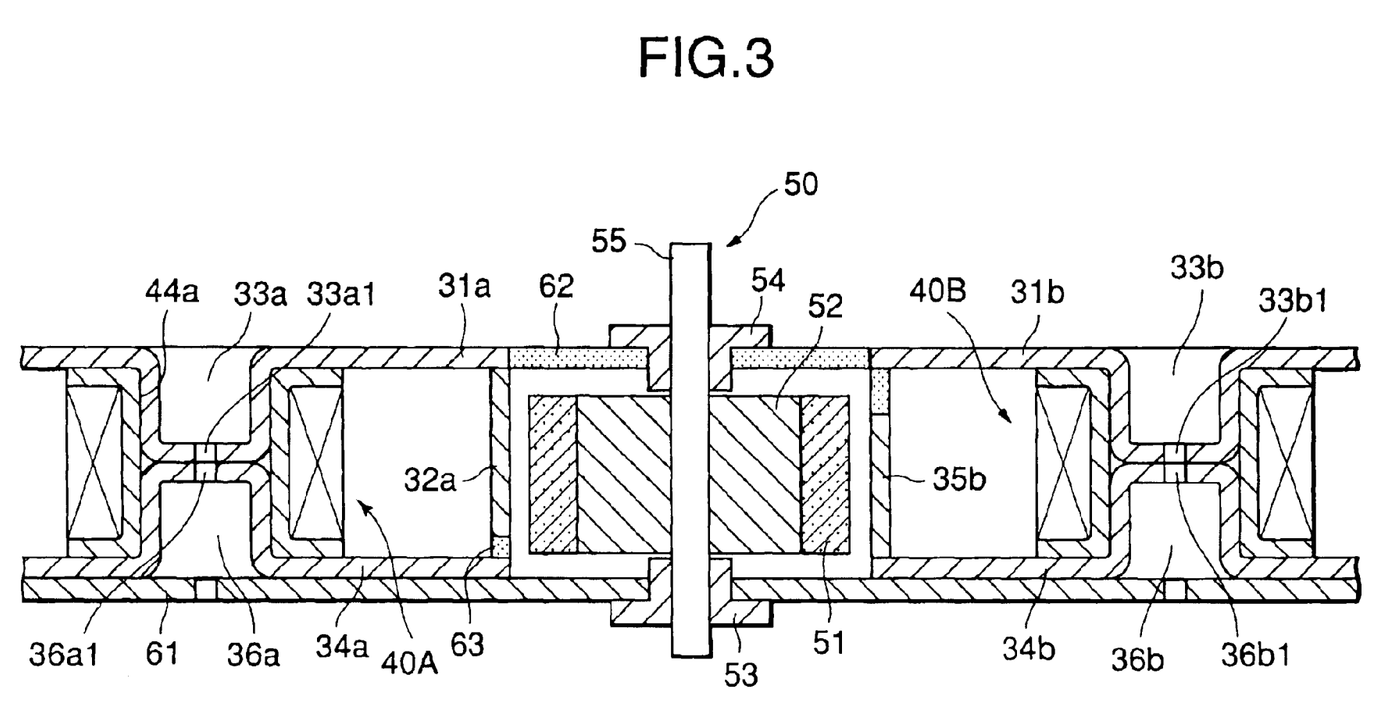
FIG. 3 is a cross sectional view of the low-profile stepping motor of FIG. 2.

Referring to FIG. 3, the protrusions 33a and 36a are formed on the first upper and lower stator yokes 31a and 34a, respectively, by drawing process, and lug holes 33a1 and 36a1 are provided centrally at respective top lids of the protrusions 33a and 36a. And the protrusions 33b and 36b are formed on the second upper and lower stator yokes 31b and 34b, respectively, by drawing process, and lug holes 33b1 and 36b1 are provided centrally at respective top lids of the protrusions 33b and 36b.

The cylindrical protrusion 33a is fitted into the through-hole 44a of the first coil unit 40A from the upper side, the protrusion 36a is fitted into the through-hole 44a of the first coil unit 40A from the lower side, and the top lids of the protrusions 33a and 36a come in contact with each other. A positioning pin (not shown) is let through the lug holes 33a1 and 36a1, and the protrusions 33a and 36a are connected to each other by bonding or welding, whereby the first upper and lower stator yokes 31a and 34a are put together with each other. When the protrusions 33a1 and 36a1 are connected to each other by bonding, an electrically conductive adhesive is applied to the top lids thereof, and when the protrusions 33a1 and 36a1 are connected by welding, welding heads are put inside the protrusions 33a1 and 36a1 for electric welding.

When the first upper and lower stator yokes 31a and 34a are put together as described above, the second upper and lower stator yokes 31b and 34b are also put together with each other in the same way as described above.

Since the top lids of the protrusions 33a and 36a are connected to each other, a part of the closed magnetic path is formed by the first upper stator yoke 31a together with the first lower stator yoke 34a. Also, since the top lids of the protrusions 33b and 33b are connected to each other, a part of a closed magnetic path is formed by the second upper stator yoke 31b together with the second lower stator yoke 34b.

A pole tooth 32a represents one pole tooth of the first upper stator yoke 31a, and a pole tooth 35b represents one pole tooth of the second lower stator yoke 34b. Resin is filled in a gap space between the meshing pole teeth for reinforcement thereby forming a resin portion 63, which is preferable with respect to vibration. When resin is filled in the gap space between the meshing pole teeth forming the resin portion 63, a resin wall 62 is formed simultaneously at the same process. An upper bearing 54 is fixed to the resin wall 62, and the rotary shaft 55 of the rotor assembly 50 is let through the upper bearing 54. Finally, a face plate 61, which is punched out of a non-magnetic steel plate and which has a lower bearing 53 fixed thereto, is fixedly attached to the first and second lower stator yokes 34a and 34b by welding, bonding or crimping. The rotor assembly 50 is rotatably supported by the upper and lower bearings 54 and 53.

Figure 4:
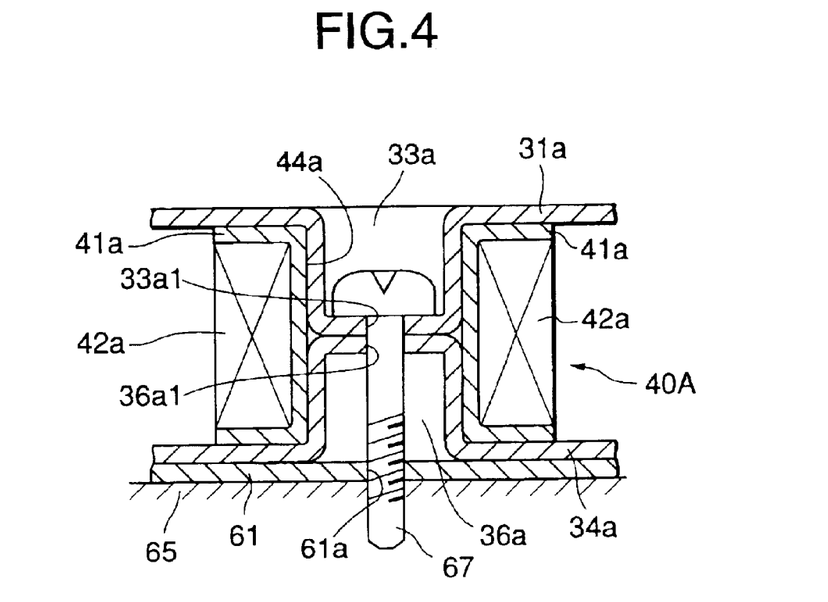
FIG. 4 is an enlarged cross sectional view of two opposing hollow-cylindrical protrusions of the low-profile stepping motor of FIG. 2, showing how the low-profile motor is fixed to a mount board.

Referring now to FIG. 4, the protrusion 33a of the first upper stator yoke 31a is fitted into the through-hole 44a of the coil unit 40A from the upper side, and the protrusion 36a of the first lower stator yoke 34a is fitted into the through-hole 44a from the lower side. The first upper and lower stator yokes 31a and 34a are fixedly put together sandwiching the first coil unit 40A such that the top lids of the protrusions 33a and 36a are in contact with each other and connected to each other by bonding or welding. The face plate 61 is fixedly attached to the first lower stator yoke 34a. The protrusions 33a and 36a have on their respective top lids the lug holes 33a1 and 36a1 sized identical with each other and positioned concentric with each other, and the face plate 61 has a lug hole 61a sized identical with and positioned concentric with the lug holes 33a1 and 36a1. The first upper and lower stator yokes 31a and 34a are fixedly attached to a mount board 65 such that a screw 67 goes through the lug holes 31a1, 36a1 and 61a and screws into the mount board 65.

The second upper and lower stator yokes 31b and 34b are also fixedly put together sandwiching the second coil unit 40B, and are fixedly attached, together with the face plate 61 fixed to the second lower stator yoke 34b, to the mount board 65 in the same way as the first upper and lower stator yokes 31a and 34a.

In the first embodiment of the present invention, while the low-profile stepping motor of the present invention can be reduced in thickness, the stator upper and lower stator yokes can be easily put together without any special structure such as a spacer, and the coil units can be easily attached to the stator yokes by means of the protrusions of the stator yokes. The stator yokes can be easily aligned to each other by inserting a pin through the lug holes formed at the top lids of the protrusions.

Since the protrusions have their respective top lids in contact with each other and connected to each other by bonding or welding, a closed magnetic path can be surely formed. And if the protrusions have a height identical with each other, a better magnetic connection can be achieved.

Also, the low-profile stepping motor of the present invention can be easily fixed to the mount board by simply inserting a screw through the lug holes formed at the top lids of the protrusions and at the face plate and driving the screw into the mount board. The protrusions are hollow, and the screw head can be well lodged therein without sticking out.

Figure 5:
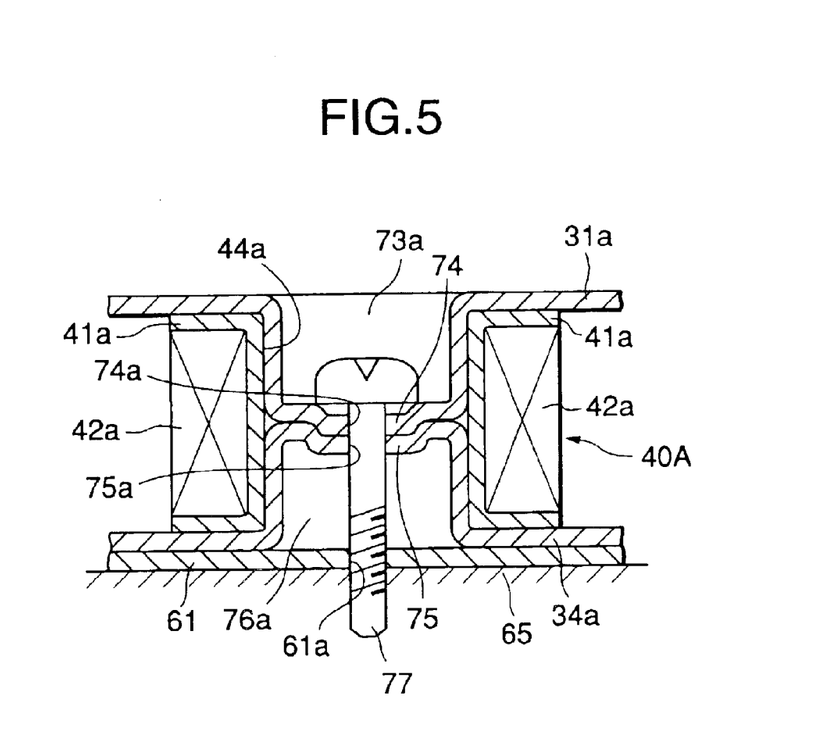
FIG. 5 is an enlarged cross sectional view of two opposing hollow-cylindrical protrusions of a low-profile stepping motor according to a second embodiment of the present invention.

A second embodiment of the present invention will now be described with reference to FIG. 5. As shown in FIG. 5, a hollow-cylindrical protrusion 73a with a top lid is formed on the first upper stator yoke 31a by drawing process, and the top lid has a circular portion 74 raised (downward in FIG. 5) at its center. Also, a hollow-cylindrical protrusion 76a with a top lid is formed on the first lower stator yoke 34a by drawing process, and the top lid has a circular portion 75 recessed (downward in FIG. 5) at its center. The recessed circular portion 75 formed at the top lid of the protrusion 76a is adapted to engage with the raised circular portion 74 formed at the top lid of the protrusion 73a.

The protrusion 73a of the first upper stator yoke 31a is fitted into the through-hole 44a of the first coil unit 40A from the upper side, and the protrusion 76a of the first lower stator yoke 34a is fitted into the through-hole 44a from the lower side and is positioned to be aligned to the protrusion 73a such that the recessed circular portion 75 at the top lid of the protrusion 76a engages with the raised circular portion 74 at the top lid of the protrusion 73a. The protrusions 73a and 76a have their respective top lids in contact with each other and connected to each other by bonding or welding thereby firmly holding the first unit coil 40A. The face plate 61 is fixedly attached to the first lower stator yoke 34a. Lug holes 74a and 75a sized identical with each other and positioned concentric with each other are formed centrally at the circular portions 74 and 75, respectively, and the face plate 61 has a lug hole 61a sized identical with and positioned concentric with the lug holes 74a and 75a.

The first upper and lower stator yokes 31a and 34a are fixedly attached to the mount board 65 such that a screw 77 goes through the lug holes 74a1, 75a and 61a and screws into the mount board 65. The second upper stator yokes 31b and 34b are also fixedly attached to the mount board 65 in the same way as the first upper and lower stator yokes 31a and 34a.

In the second embodiment of the present invention, since the raised and recessed circular portions at the top lids of the protrusions are adapted to engage with each other as described above, the upper and lower stator yokes can be easily positioned to be aligned to each other by simply abutting the top lids of the protrusions against each other and can be easily put together without any special structure such as a spacer. And, the top lids of the protrusions are in contact with each other and connected to each other by bonding or welding, whereby a closed magnetic path is surely formed.

Also, the low-profile stepping motor of the present invention can be easily fixed to the mount board by simply inserting a screw through the lug holes formed at the top lids of the protrusions and at the plate and driving the screw into the mount board. The protrusions are hollow, and the screw head can be well lodged therein without sticking out.

Figure 6:
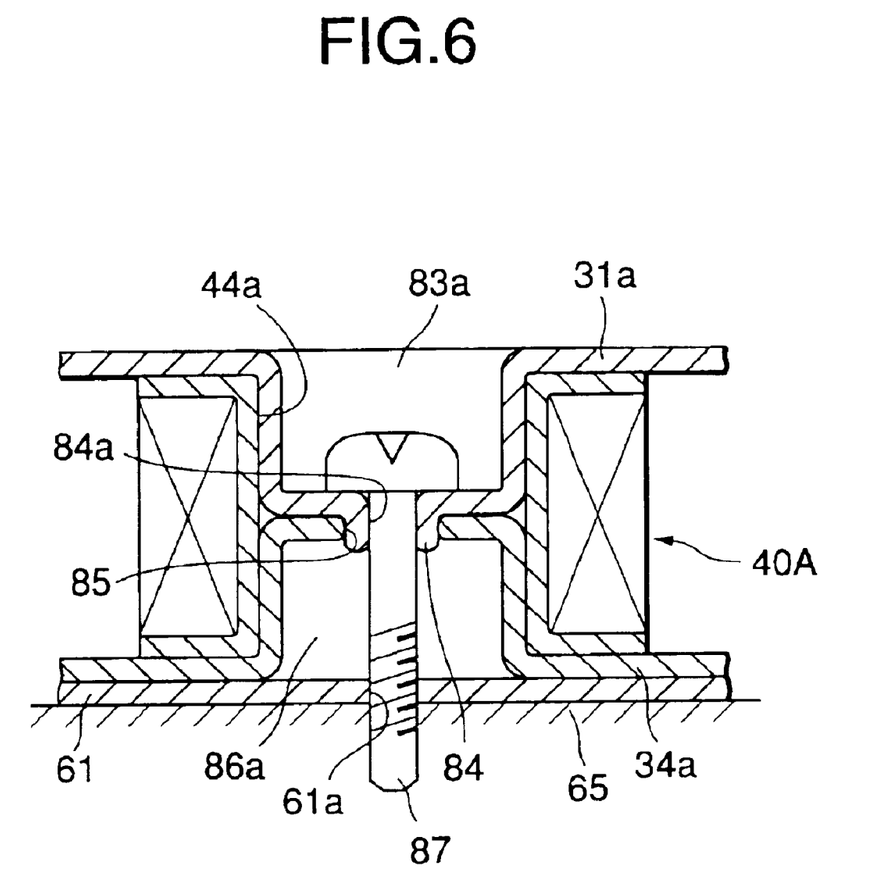
FIG. 6 is an enlarged cross sectional view of two opposing hollow-cylindrical protrusions of a low-profile stepping motor according to a third embodiment of the present invention.

A third embodiment of the present invention will now be described with reference to FIG. 6. As shown in FIG. 6, a hollow-cylindrical protrusion 83a with a top lid is formed on the first upper stator yoke 31a by drawing process, and the top lid has a circular rim 84 raised (downward in FIG. 6) at its center and defining a lug hole 84a thereinside. Also, a hollow-cylindrical protrusion 86a with a top lid is formed on the first lower stator yoke 34a by drawing process, and the top lid has a hole 85 at its center. The hole 85 is adapted to engage with the raised circular rim 84 formed at the top lid of the protrusion 83a.

The protrusion 83a of the first upper stator yoke 31a is fitted into the through-hole 44a of the first coil unit 40A from the upper side, and the protrusion 86a of the first lower stator yoke 34a is fitted into the through-hole 44a from the lower side and is positioned to be aligned to the protrusion 83a such that the hole 85 at the top lid of the protrusion 86a engages with the raised circular rim 84 at the top lid of the protrusion 83a. The protrusions 83a and 86a have their respective top lids in contact with each other and connected to each other by bonding or welding thereby firmly holding the first coil unit 40A. The face plate 61 has a lug hole 61a sized identical with and positioned concentric with the lug hole 84a and is fixedly attached to the first lower stator yoke 34a.

The first upper and lower stator yokes 31a and 34a are fixedly attached to the mount board 65 such that a screw 87 goes through the lug holes 84a and 61a and screws into the mount board 65. The second upper stator yokes 31b and 34b are also fixedly attached to the mount board 65 in the same way as the first upper and lower stator yokes 31a and 34a.

In the third embodiment of the present invention, the raised circular rim and the hole at the top lids of the protrusions are adapted to engage with each other as described above, the upper and lower stator yokes can be easily positioned to be aligned to each other by simply abutting the top lids of the protrusions against each other and can be easily put together without any special structure such as a spacer. And, the top lids of the protrusions are in contact with each other and connected to each other by bonding or welding thereby surely forming a closed magnetic path.

Also, the low-profile stepping motor of the present invention can be easily fixed to the mount board without any special structure by simply inserting a screw through the lug holes formed at the top lids of the protrusions and at the face plate and driving the screw into the mount board. The protrusions are hollow, and the screw head can be well lodged therein without sticking out.

In the above embodiments of the present invention, the low-profile stepping motor is attached to the mount board with the face plate located toward the mount board, but may alternatively be attached to the mount board with the face plate located away from the mount board. In this case, the lug hole at the face plate may have a diameter large enough to allow the screw head to go therethrough thereby minimizing the length of the screw.

What is claimed is:

1. A low-profile stepping motor comprising
a first stator unit including: a first upper stator yoke having a plurality of pole teeth which are formed along its semicircular inner circumference, the first upper stator yoke having a hollow-cylindrical protrusion with a top lid; a first lower stator yoke having a plurality of pole teeth which are formed along its semicircular inner circumference and which mesh with the pole teeth of the first upper stator yoke, the first lower stator yoke having a hollow-cylindrical protrusion with a top lid, which opposes the protrusion of the first upper stator yoke thus configuring a pair of opposing protrusions; and a first coil unit fixedly sandwiched between the first upper and lower stator yokes,
a second stator unit including: a second upper stator yoke formed as one piece integrally with the first upper stator yoke, and having a plurality of pole teeth which are formed along its semicircular inner circumference, the second upper stator yoke having a hollow-cylindrical protrusion with a top lid; a second lower stator yoke formed as one piece integrally with the first lower stator yoke, and having a plurality of pole teeth which are formed along its semicircular inner circumference and which mesh with the pole teeth of the second upper stator yoke, the second lower stator yoke having a hollow-cylindrical protrusion with a top lid, which opposes the protrusion of the second upper stator yoke thus configuring a pair of opposing protrusions; and a second coil unit fixedly sandwiched between the second upper and lower stator yokes and arranged horizontally flush with the first coil unit, and a rotor assembly rotatably disposed in a circular open space defined by the pole teeth of the first and second stator units.

2. A low-profile stepping motor according to claim 1, wherein the protrusions are formed by a process of drawing.

3. A low-profile stepping motor according to claim 1 or 2, wherein the pair of opposing protrusions have their respective top lids butting each other.

4. A low-profile stepping motor according to claim 3, wherein the top lids each have a flat abutting surface.

5. A low-profile stepping motor according to claim 3, wherein the top lids each have a lug hole formed at its center.

6. A low-profile stepping motor according to claim 1, wherein the coil unit is fixedly attached to the pair of opposing protrusions such that the protrusions are fitted into a through-hole formed at a center of the coil unit respectively from upper and lower sides thereof.

7. A low-profile stepping motor according to claim 1 or 2, wherein one protrusion of the pair of opposing protrusions has a raised circular portion at its top lid, and the other protrusion thereof has at its top lid a recessed circular portion adapted to engage with the raised circular portion at the top lid of the one protrusion.

8. A low-profile stepping motor according to claim 1 or 2, wherein one protrusion of the pair of opposing protrusions has a raised circular rim at its top lid, and the other protrusion thereof has at its top lid a circular hole adapted to engage with the raised circular rim at the top lid of the one protrusion.

* * * * *